US006985817B2

(12) United States Patent
Saenz Alvarado

(10) Patent No.: US 6,985,817 B2
(45) Date of Patent: Jan. 10, 2006

(54) METHOD AND SYSTEM FOR THE PREDICTION OF EARTHQUAKES

(75) Inventor: Victor Saenz Alvarado, San Jose (CR)

(73) Assignee: Windsor Management Luxembourg S.A., (LU)

( * ) Notice: Subject to any disclaimer, the term of this patent is extended or adjusted under 35 U.S.C. 154(b) by 72 days.

(21) Appl. No.: 10/789,626

(22) Filed: Feb. 26, 2004

(65) Prior Publication Data

US 2004/0172196 A1    Sep. 2, 2004

(30) Foreign Application Priority Data

Feb. 27, 2003  (IT)  .......................... MI2003A0350

(51) Int. Cl.
    *G01V 3/12*      (2006.01)
(52) U.S. Cl. ...................................................... 702/15
(58) Field of Classification Search ................. 702/15, 702/4, 3, 189–191, 193–197; 706/929; 340/690; 187/278; 324/71.1, 72, 620–628, 323, 335, 324/345
See application file for complete search history.

(56) References Cited

U.S. PATENT DOCUMENTS

| | | | | |
|---|---|---|---|---|
| 4,513,383 A | * | 4/1985 | Hackett, Jr. ................. | 702/190 |
| 4,724,390 A | * | 2/1988 | Rauscher et al. ........... | 324/344 |
| 5,811,974 A | * | 9/1998 | Hata .......................... | 324/344 |
| 6,873,265 B2 | * | 3/2005 | Bleier ........................ | 340/690 |
| 2003/0204378 A1 | * | 10/2003 | Cai ............................ | 702/189 |

* cited by examiner

*Primary Examiner*—Donald McElheny, Jr.
(74) *Attorney, Agent, or Firm*—Hedman & Costigan, P.C.

(57) ABSTRACT

Method for the prediction of earthquakes comprising the following phases:
Detecting the low frequency electromagnetic waves that are released due to mechanical stress in underground rock layers, with at least three peripheral detecting stations distributed in predetermined positions over a territory, temporally marking the premonitory signals received relating to said electromagnetic waves by means of a GPS receiver, sending said marked signals to a central processing station, calculating the differences in the receiving times between a signal coming from a peripheral station and another signal coming from a different peripheral station.

11 Claims, 4 Drawing Sheets

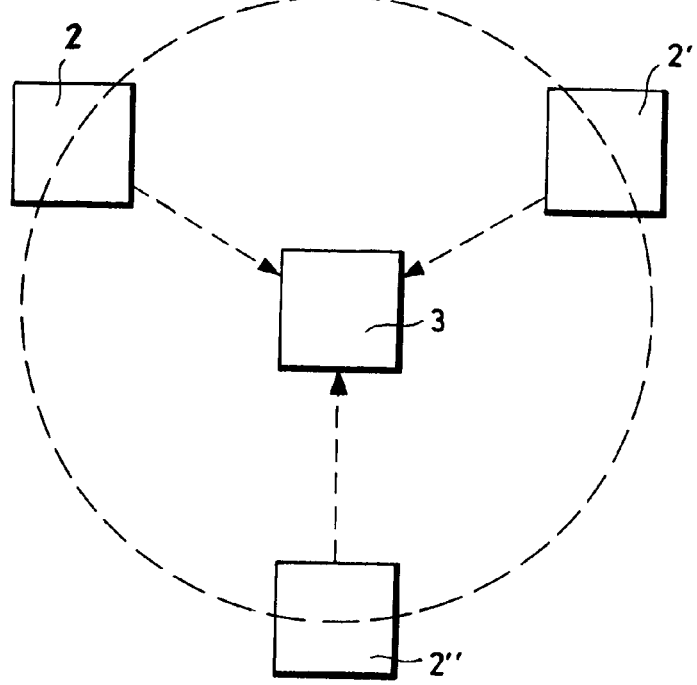
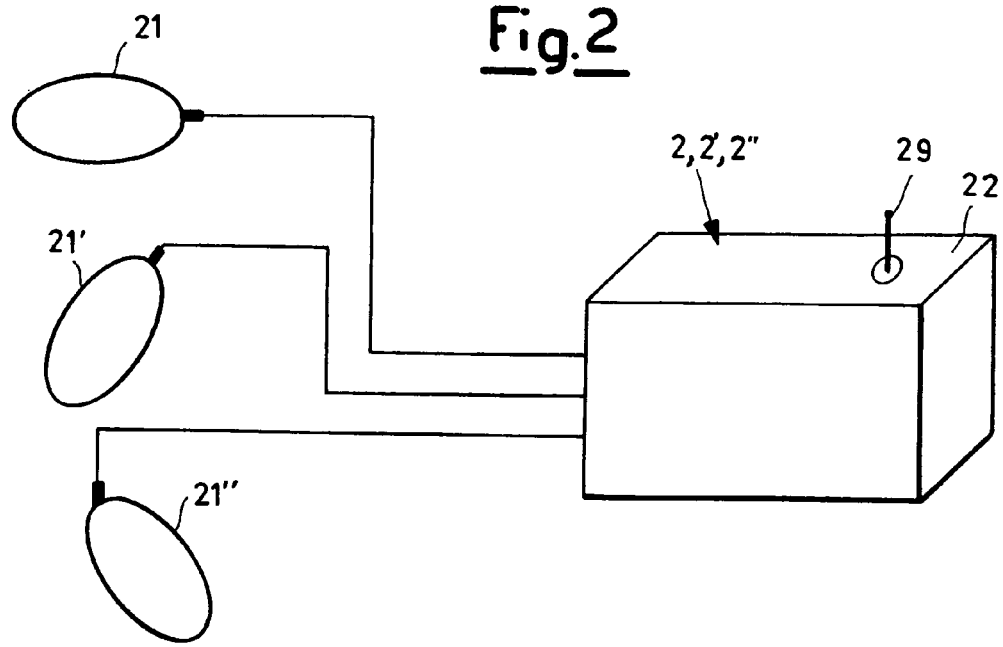

METHOD AND SYSTEM FOR THE PREDICTION OF EARTHQUAKES

The present invention relates to a method and a system for the prediction of earthquakes. In particular, the present invention relates to a system and method for the detection and preventive localization of earthquakes; the system is installed in high seismic risk regions and consists of several receiving stations capable of detecting low frequency electromagnetic waves which are released from below the ground due to the mechanical stress of underground rock layers subjected to compression.

The results of the detections are sent to a control center capable of processing the data received to obtain the coordinates, an indication of the intensity and when the seismic shock in formation is expected (and the period of the following earthquake).

It is known that rocks which form surface layers of the earth's crust, when subjected to extremely strong mechanical compression stress, emit electromagnetic waves in the VLF band.

The Applicant has observed that the measurement of these pre-seismic emissions received from special stations distributed over a territory, and their subsequent mathematic processing, allows the epicentre and expected intensity of the seism to be identified with close approximation, and with the help of an accurate statistic study of previous shocks, it is possible to determine with sufficient precision the number of hours which preceding a destructive shock.

The present invention is based on the fact that in seismic areas, the earth's crust is periodically subjected to strong tensions and compressions which, when reaching breakage, give rise to catastrophic seismic phenomena.

It is known that seismic regions of the earth's crust mainly consist of rocks with high crystalline contents and that if these are subjected to strong mechanical stress, they generate electricity (Piezoelectricity) with the consequent generation of VLF electromagnetic waves. These variations in electricity create ate electromagnetic waves with an intensity and frequency correlated to the mechanical stress which has generated them.

These electromagnetic waves have frequencies ranging from a few tenths of Hertz to several tens of Kiloherz; as the ground tends to attenuate more high frequencies, the deeper the phenomenon which has generated them, the lower will be the spectrum received.

As it is known that the intensity of these electromagnetic emissions is proportional to the square of the forces applied per unit of rock volume, the Applicant has observed that, particularly after an accurate statistic study of the territory, it is possible to predict with a good approximation the intensity of the seism which is under formation.

It should be noted that electromagnetic waves generated in an area of mechanical anomaly, are attenuated with the square of the distance from this point to the receiving point, this means that the further away from the source, the intensity of the premonitory emissions of the seism will become increasingly weaker and concealed from disturbances generated by human beings, static discharges and foreign radio waves.

For this reason, special analogical and digital (DSP) processing and filtering techniques of the signals have been used in the present invention.

The objective of the present invention is to predict, on the basis of an analysis of premonitory VLF electromagnetic wave emissions, where the epicentre of the seism is located, the approximate intensity of the shock and when this will occur.

In order to determine the epicentre of the seism, a detection network is used on the territory with receiving stations situated at a distance of various tens to approximately a hundred kilometers from each other (a minimum of three), possibly in areas as far as possible from sources of disturbance such as high voltage electric lines, cities, industrial centers. Each of these peripheral stations consists of a series of suitable components housed in a metal container (protected or shelter).

These peripheral detection stations are programmed so as to be able to automatically send, via radio or telephone, the result of their detections to a central unit capable of processing the signals coming from said peripheral units, until the exact location of the epicentre of the future earthquake is identified.

An aspect of the present invention relates to a system for the prediction of earthquakes comprising at least three peripheral detection stations distributed in pre-determined positions over a territory, each station being capable of detecting the low frequency electromagnetic waves which are released due to the mechanical stress of the underground rock layers, a central processing station which receives signals relating to said electromagnetic waves from each of said peripheral detection stations and processes said detections until an indication of the epicentre and entity of said earthquake is obtained, characterized in that each of said peripheral stations comprises at least one ring aerial for each of the directions defined by a set of three Cartesian axes suitable for detecting said electromagnetic waves, at least one of the ring aerials is an omnidirectional wide band aerial connected to a reciever having an FFT process in real time suitable for detecting a preferred frequency bands for receiving said electromagnetic waves substantially without disturbance frequencies, this allows the reception of all ring aerials on said disturbance-free band free to be tuned in, thus widely increasing their sensitivity.

A further aspect of the present invention relates to a method for the prediction of earthquakes, characterized in that it comprises the following phases:
  detecting low frequency electromagnetic waves which are released due to the mechanical stress of underground rock layers, by at least three peripheral detection stations distributed in pre-determined positions over a territory,
  temporally and accurately marking the premonitory signals relating to said electromagnetic waves by means of a GPS receiver,
  sending said marked signals to a central processing station,
  calculating the differences in the receiving times between a signal coming from a peripheral station and another signal coming from a different peripheral station.
  calculating on the basis of said time differences of arrival of the signals, the coordinates of the epicentre and depth of the earthquake by effecting a TDOA calculation.

For the sake of greater clarity, the description of the invention refers to the enclosed drawings, which are provided for purely illustrative and non-limiting purposes, in which:

FIG. 1 schematically shows in its essential parts, the prediction system according to the present invention comprising at least three peripheral detection stations and at least one central processing station;

FIG. 2 schematically shows one of the above peripheral detection stations of VLF electromagnetic waves according to the present invention;

Figure 3:
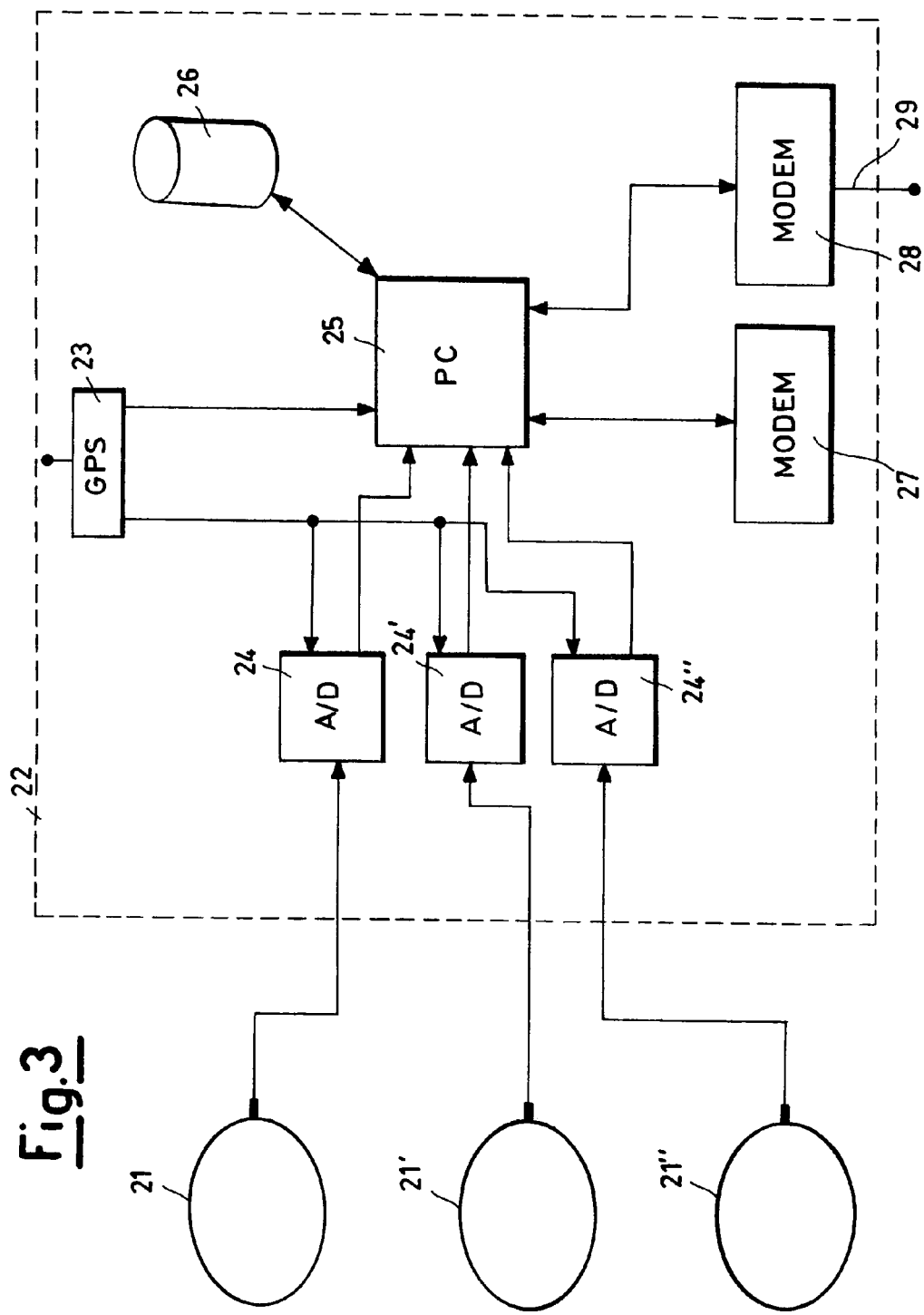
FIG. 3 shows a block scheme of the operating components present in the above peripheral detection station according to the present invention.

With reference to the above figures, the prediction system according to the present invention comprises at least three peripheral detection stations 2, 2' and 2" distributed over the territory and at least one central processing station 3 which receives the detections effected by the peripheral stations.

Each peripheral detection station comprises a system of three main balanced protected ring aerials 21, 21' and 21" and at least one secondary wire aerial preferably underground.

Of the protected ring aerials, there is preferably one for each direction from which the detection is effected. For example, a first wide-band ring aerial 21 arranged horizontally, is used, together with a second ring aerial 21' arranged vertically in a north-south direction, and a third ring aerial 21" arranged vertically, orthogonal to the previous one, arranged in an east-west direction. In this way, detections can be effected on the three directions forming a series of three Cartesian axes x, y and z.

These aerials detect the electromagnetic waves which are generated from seismic phenomena as mentioned above.

Weak signals leaving the magnetic ring aerials are amplified with special very low noise current amplifiers situated directly in the metallic boxes in the base of the aerials themselves in order to improve their disturbance rejection, the same container also contains the necessary circuits for the automatic tuning of the N-S E-W aerials, these signals are then sent to suitable devices contained in a container 22, (after being adapted in impedance, amplified and filtered) where the signal is converted from analogical to digital.

Said peripheral detection unit also comprises a GPS 23 receiver, at least one analogical digital converter for each aerial present in the unit 24, 24' and 24", a local processing unit 25, a memorization device 26, a telephonic modem 27 and a modem via earth or satellite radio 28 equipped with an aerial 29 (for applications in particularly inaccessible areas, a connection via satellite can be used).

Once they are inside the container, the same signals detected by the above aerials are converted from analogical to digital, by means of said A/D devices.

Once these signals have been converted to digital, they are sent to said central processing station after being sampled by means of a synchronization signal coming from said GPS 23 satellite receiver which also supplies the time-sample marks.

Said peripheral detection stations are programmed so as to be able to automatically send, via earth or satellite radio modem or by said telephonic modem, the result of their detections to said central processing station capable of processing, by means of a central processing unit, the signals coming from said peripheral units, until obtaining the exact localization of the epicentre of the future earthquake.

Figure 4:
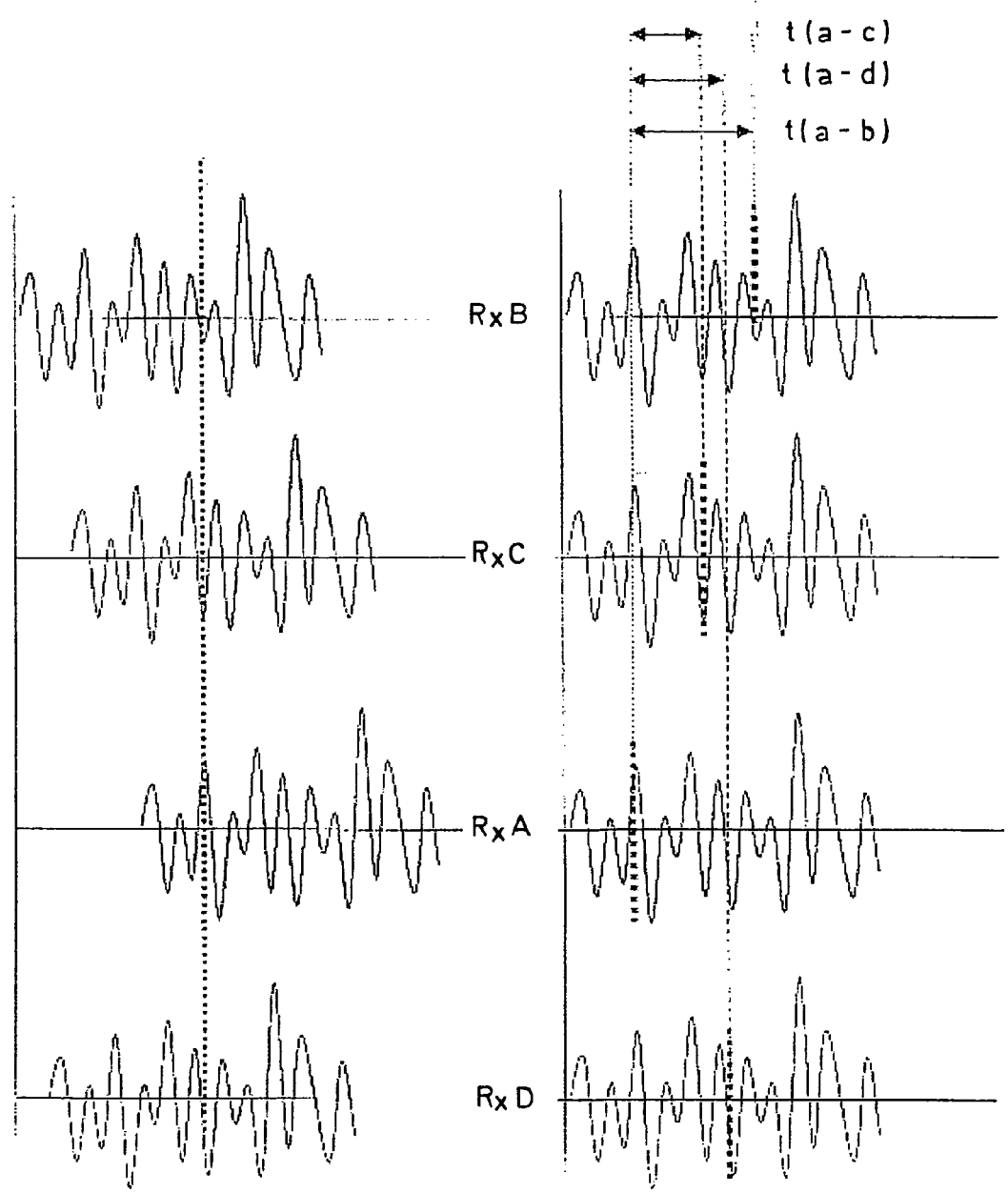
FIG. 4 is a diagram which illustrates the procedure with which a central monitoring unit processes the information received from the various peripheral detection stations in order to locate the epicentre of the seism according to the invention.
Figure 5:
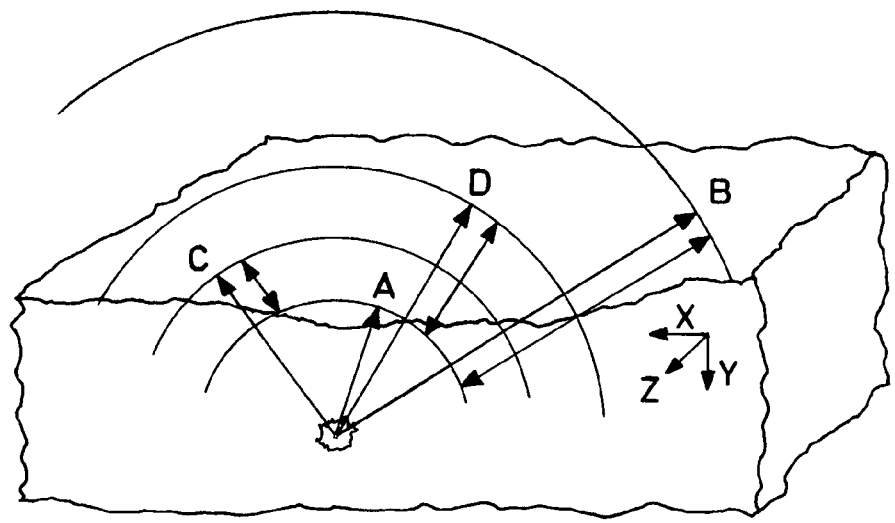
FIG. 5 is a three-dimensional cross-section of a portion of the earth's crust where four peripheral detection stations belonging to the system according to the present invention, are operating.

The operating logic of the central processing center is schematized in FIG. 4, in which the processing of signals coming from four distinct peripheral detection stations (Rx-A, Rx-B, Rx-C, Rx-D) is assumed.

More specifically, this operation consists in processing the signals coming from the detection stations, suitably equalized, and finding the correlation peak among them (the correlation consists in letting the signals received from the stations temporally pass numerically until, within a definite time lapse, they coincide with each other).

The correlation peak serves to temporally align the signals received in the detection stations, thus being able to measure the relative delays [t(a–b), t(a–c), t(a–d)] between the time marks of the signals recieved from the stations distributed over the territory.

In other words, the VLF signals received from the peripheral detection stations are marked with a time signal deriving from the GPS station, and subsequently the arrival time differences are calculated in the central processing station, by means of the correlation and GPS marking technique, as shown in FIG. 4. A possible temporal inaccuracy of a marking with a GPS does not exceed a micro-second, thus providing a theoretical precision of 0.3 Km in the determination of the epicentre, assuming that this is in a sole point.

The delays are measured on several samples of signals received from each detection station; the results are then averaged and, when a minimum datum variance is reached, the value is acquired.

At this point, as the coordinates of the detection stations and receiving time differences of the premonitory signal are known, it is possible to obtain the coordinates of the epicentre and depth of the seism using the known TDOA (Time Difference of Arrival) technique.

This technique does in fact make it possible, with three detection stations, to operate in 2D i.e. the coordinates of the epicentre in x-y; whereas, with four or more detection stations it also ensures, in addition to a greater precision, the possibility of operating in 3D, i.e. of also detecting the z axis which represents the depth of the epicentre.

With respect to an assigned Cartesian reference system (x, y, z) as shown in FIG. 4, the incognito coordinates of the emission signal are obtained by solving the system:

$$\begin{cases} \sqrt{(x-x_b)^2 + (y-y_b)^2 + (z-z_b)^2} - \sqrt{(x-x_a)^2 + (y-y_a)^2 + (z-z_a)^2} = c \cdot t_{ab} \\ \sqrt{(x-x_c)^2 + (y-y_c)^2 + (z-z_c)^2} - \sqrt{(x-x_a)^2 + (y-y_a)^2 + (z-z_a)^2} = c \cdot t_{ac} \\ \sqrt{(x-x_d)^2 + (y-y_d)^2 + (z-z_d)^2} - \sqrt{(x-x_a)^2 + (y-y_a)^2 + (z-z_a)^2} = c \cdot t_{ad} \end{cases}$$

Wherein t(ab), t(ac), t(ad) are the delays of the signals received from stations B, C, D respectively with respect to the signal received in A; wherein the constant C is the propagation rate of the electromagnetic waves underground.

With the Cartesian system indicated above, it is therefore possible to identify the coordinates (x, y) of the epicentre as well as its depth (z).

If there are only three peripheral detection stations, the processing procedure should take into account the delays of the signals of two stations with respect to the signals of the third; the relative calculation system would consequently consist of only two equations with two incognitos: specifically the coordinates (x, y) of the epicentre.

According to the present invention, in order to improve the sensitivity of the overall receiving system, a method is used for better adapting and tuning said ring aerials as described below.

It has already been mentioned that one of the ring aerials is a wide band aerial, i.e. an aerial capable of detecting frequencies for example of 10 Hz up to tens of Khz.

Each ring aerial is equipped with an aerial tuner capable of regulating the spectrum of frequencies which can be received from the aerials themselves.

Said first horizontal ring aerial is a wide band aerial and is equipped with a microprocessor digital receiver (piloting electronic circuit), which effects an FFT analysis of the signal received from the aerial. On the basis of the spectrum analyzed with said FFT, all the stable disturbance frequencies identified as disturbance are eliminated (in which the presence of known disturbances is possible), (for example a and Omega signals used by submarines at 40 Hz and 80 Hz approximately, natural signals such as the discharge of streaks of lightning received on other bands and cancelled by the main signal, Shumann resonances at 7.7 and 21 Hz, etc.). The remaining frequency bands which are substantially free of disturbances are selected for the reception of the electromagnetic waves of the precursors. The piloting circuit analyzes and controls the aerial tuner in real time in order to allow a re-tuning of the aerials if a new disturbance is introduced into the system. The tuners of the remaining aerials are also preferably controlled by means of the FFT effected on the signal received from the wide band aerial.

Figure 6:
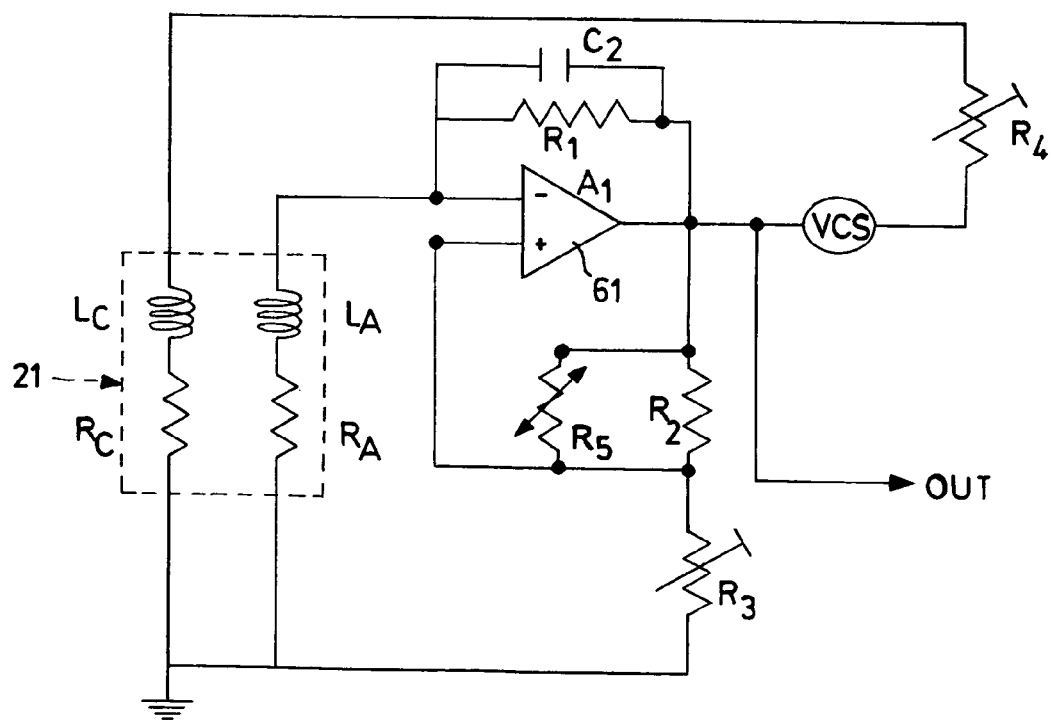
FIG. 6 illustrates an amplifying circuit for ring aerials according to the present invention.

Another possibility for improving the sensitivity of the aerials is to provide them with a low noise amplifying circuit 6 as illustrated in FIG. 6 which preferably uses an operational amplifier 61.

The receiving ring aerial is accurately schematized and represented as an Ra resistance in series with an inductance La. Said aerial is equipped with a counter-reaction coil Lc having a counter-reaction resistance in series Rc.

It is known that the sensitivity of an aerial connected to a current amplifier has two limits, with an increase in the frequency, the impedance generated by the inductance La increases and consequently the sensitivity of the aerial decreases with higher frequencies, whereas the resistance Ra limits the general sensitivity of the aerial. In order to avoid this, the reaction inductance Lc provides and additional La field, this is obtained by feeding this with the outgoing signal converted from voltage current (VCS) suitably regulated a regulation resistance R4, this opposes the inductance effect La bringing the total impedance of the aerial to almost zero, by extending its receiving frequency band upwards.

The amplifying circuit comprises an RC circuit consisting of a C1 condenser having a suitably predetermined capacity and a divider consisting of a resistance R2 and an adjustable resistance R3, which when suitably regulated, provides a positive reaction which reduces the effect of Ra on all frequencies.

The presence of a resistance R5 with a suitably calculated negative coefficient stabilizes the gain of the amplifier against the resistance variations of the copper wire of the aerial due to the variations in temperature.

The amplifier is substantially a current amplifier in which a resistance R1 regulates the current gain, and a condenser C2 stabilizes the operational 61 at extremely high frequencies. The use of these techniques already known in electronics, applied in this particular circuit, allows the efficiency and sensitivity of all the aerials used to be increased by numerous dB.

Furthermore, in order to avoid all interferences, all the sensitive amplification and tuning circuits are arranged inside an airtight protected metallic container solidal with the aerial itself.

According to the present invention, additional magnetic aerials can be used, capable of picking up extremely low frequency signals, for example from 0.1 Hz to 10 Hz. These aerials comprise a cylindrical magnetic nucleus made of ferrite on which a copper wire is wound. The arrangement of the cylinder determines the direction x, y or z from which the aerial receives the electromagnetic signals.

These aerials can also be advantageously equipped with said amplifying circuits.

In order to improve the reliability of the system, each peripheral detection station comprises a radiogoniometric localization device which is capable of detecting the direction of arrival in degrees of the electromagnetic signals. These directions are sent to the central processing station which effects a processing, by crossing the directions of origin of the electromagnetic waves in the various peripheral stations, to determine the epicentre of the seism.

The point of origin of the signals is compared with the results obtained with the delay difference method and the radiogoniometric and mediate method, a map of the space distribution is then made in order to be able to track the borders of the generation area of the signals; this datum can give an indication on the intensity of the seism in formation; the vaster the area of origin of the signals, the stronger the seism will be. Studies effected indicate that an area of 20 Km in diameter can give a seism of about the $7^{th}$ Richter degree.

A further estimate of the epicentre and entity of a seism can be obtained, combined with the electromagnetic wave system, by measuring the variations in the intensity and direction of the currents dispersed over the land by means of electric field measurers. In particular, these extremely low frequency electric fields can be detected by means of NS-EW cross aerials consisting of metal wires arranged on the land, orthogonal to each other. The signals detected at the heads of these wires can be treated in substantially the same way as the signals coming from the electromagnetic waves, (marking with the GPS signal) and then subsequently sent to the central processing station.

Furthermore, each peripheral station can substantially be in a rest position until one of the signals coming from any of the aerials exceeds a predetermined threshold. In reply to one of these events, the station can be activated and at the same time also allow the other peripheral stations to be activated through said central unit.

What is claimed is:

1. A system for the prediction of earthquakes which comprises:
    at least three peripheral detection stations distributed in predetermined positions over a territory, each station being capable of detecting the low frequency electromagnetic waves which are released as a result of mechanical stress of the underground rock layers,
    a central processing station which receives signals relating to said electromagnetic waves from each of said peripheral detection stations and processes said detections in order to obtain an indication of the epicentre and on the entity of the earthquake, characterized in that each of said peripheral stations comprises at least one ring aerial for each of the directions defined by a series of three Cartesian axes suitable for detecting said electromagnetic waves, at least one of the ring aerials is a wide band aerial and is equipped with a receiver suitable for detecting a band in a preferred receiving frequency of said electromagnetic waves substantially free of disturbance frequencies, and tuning the reception of all the ring aerials on said disturbance-free band, a cancellation circuit of impulsive atmospheric disturbances received on a different frequency band, which allows a signal to be obtained at the outlet, which only comprises premonitory signals freed of all disturbances.

2. The system according to claim 1, wherein each detection station also comprises a series of three magnetic aerials comprising a ferrite nucleus suitable for detecting electromagnetic waves with frequencies ranging from 0.1 Hertz to 10 Hertz, and at least a pair of aerials suitable for detecting variations in the earth's electric field.

3. The system according to claim 1, wherein each peripheral detection station comprises a radiogoniometric localization device suitable for detecting the receiving direction of said electromagnetic waves.

4. The system according to claim 2, wherein said aerials for detecting electromagnetic waves are equipped with a low noise amplifying circuit as described.

5. The system according to claim 2, wherein said central processing unit receives the detections effected by the magnetic aerials, the goniometric localization devices, the electric field aerials and generates a map of points within which the position of the epicentre of the earthquake is estimated.

6. The system according to claim 1, wherein each peripheral station comprises a GPS satellite receiver and at least one analogical digital converter for each aerial suitable for converting the signals received from the aerials into digital and marking the signals themselves, with the same temporal marker, by means of the GPS receiver.

7. The system according to claim 1, wherein each peripheral station comprises a modem for transmitting the digitalized signals to said central processing station.

8. The system according to claim 1, wherein each peripheral station comprises a GPS receiver, at least one analogical digital converter for each aerial present in the station itself, a local processing unit, a memorization device, a telephonic modem and a modem via radio equipped with an aerial.

9. The system according to claim 8, wherein said peripheral stations effect a temporal marking on the signals received from the aerials by means of said GPS receiver.

10. The system according to claim 9, wherein said central processing station receives the detections from the peripheral stations and, starting from the coordinates of the peripheral stations by means of said temporal marking of the signals detected, calculates the differences in the receiving times between one signal and another, and obtains the coordinates of the epicentre and depth of the seism by effecting a TDOA calculation.

11. A method for the prediction of earthquakes, characterized in that it comprises the following phases:

detecting low frequency electromagnetic waves which are released due to the mechanical stress of underground rock layers, by at least three peripheral detection stations distributed in predetermined positions over a territory, temporally and accurately marking the premonitory signals relating to said electromagnetic waves by means of a GPS receiver, sending said marked signals to a central processing station, calculating the differences in the receiving times between a signal coming from a peripheral station and another signal coming from a different peripheral station.

calculating on the basis of said time differences of arrival of the signals, the coordinates of the epicentre and depth of the earthquake by effecting a TDOA calculation.

* * * * *